(12) United States Patent
Dwyer et al.

(10) Patent No.: US 8,478,944 B2
(45) Date of Patent: Jul. 2, 2013

(54) METHOD AND APPARATUS FOR ADAPTIVE CACHE FRAME LOCKING AND UNLOCKING

(75) Inventors: Harry Dwyer, Annandale, NY (US); John S. Fernando, Coopersburg, PA (US)

(73) Assignee: Agere Systems LLC, Allentown, PA (US)

( * ) Notice: Subject to any disclaimer, the term of this patent is extended or adjusted under 35 U.S.C. 154(b) by 0 days.

(21) Appl. No.: 13/559,858

(22) Filed: Jul. 27, 2012

(65) Prior Publication Data

US 2013/0024620 A1    Jan. 24, 2013

Related U.S. Application Data

(62) Division of application No. 09/975,764, filed on Oct. 9, 2001, now Pat. No. 8,261,022.

(51) Int. Cl.
*G06F 12/00* (2006.01)

(52) U.S. Cl.
USPC ............................ 711/136; 711/134; 711/145

(58) Field of Classification Search
USPC ......................................... 711/134, 136, 145
See application file for complete search history.

(56) References Cited

U.S. PATENT DOCUMENTS

| | | | |
|---|---|---|---|
| 5,353,425 A | 10/1994 | Malamy et al. | 711/144 |
| 6,470,425 B1 | 10/2002 | Yamashiroya | |
| 2002/0065992 A1* | 5/2002 | Chauvel et al. | 711/141 |
| 2002/0188809 A1* | 12/2002 | Kershaw | 711/133 |

FOREIGN PATENT DOCUMENTS

| | | |
|---|---|---|
| EP | 0 687 979 | 12/1995 |
| JP | 57015274 | 1/1982 |
| JP | 2066654 | 3/1990 |

OTHER PUBLICATIONS

Kaxiras et al, "Cache Decay: Exploiting Generational Behavior to Reduce Cache Leakage Power," IEEE, (2001).
Lai et al., "Dead-Block Prediction & Dead-Block Correlating Prefetchers," IEEE, (2001).
Mendelson et al, "Modeling Live and Dead Lines in Cache Memory System," IEEE, Trans. on Computers, v. 42, No. 1, (Jan. 1993).

* cited by examiner

*Primary Examiner* — John Lane
(74) *Attorney, Agent, or Firm* — Ryan, Mason & Lewis, LLP

(57) ABSTRACT

Most recently accessed frames are locked in a cache memory. The most recently accessed frames are likely to be accessed by a task again in the near future and may be locked at the beginning of a task switch or interrupt to improve cache performance. The list of most recently used frames is updated as a task executes and may be embodied as a list of frame addresses or a flag associated with each frame. The list of most recently used frames may be separately maintained for each task if multiple tasks may interrupt each other. An adaptive frame unlocking mechanism is also disclosed that automatically unlocks frames that may cause a significant performance degradation for a task. The adaptive frame unlocking mechanism monitors a number of times a task experiences a frame miss and unlocks a given frame if the number of frame misses exceeds a predefined threshold.

12 Claims, 3 Drawing Sheets

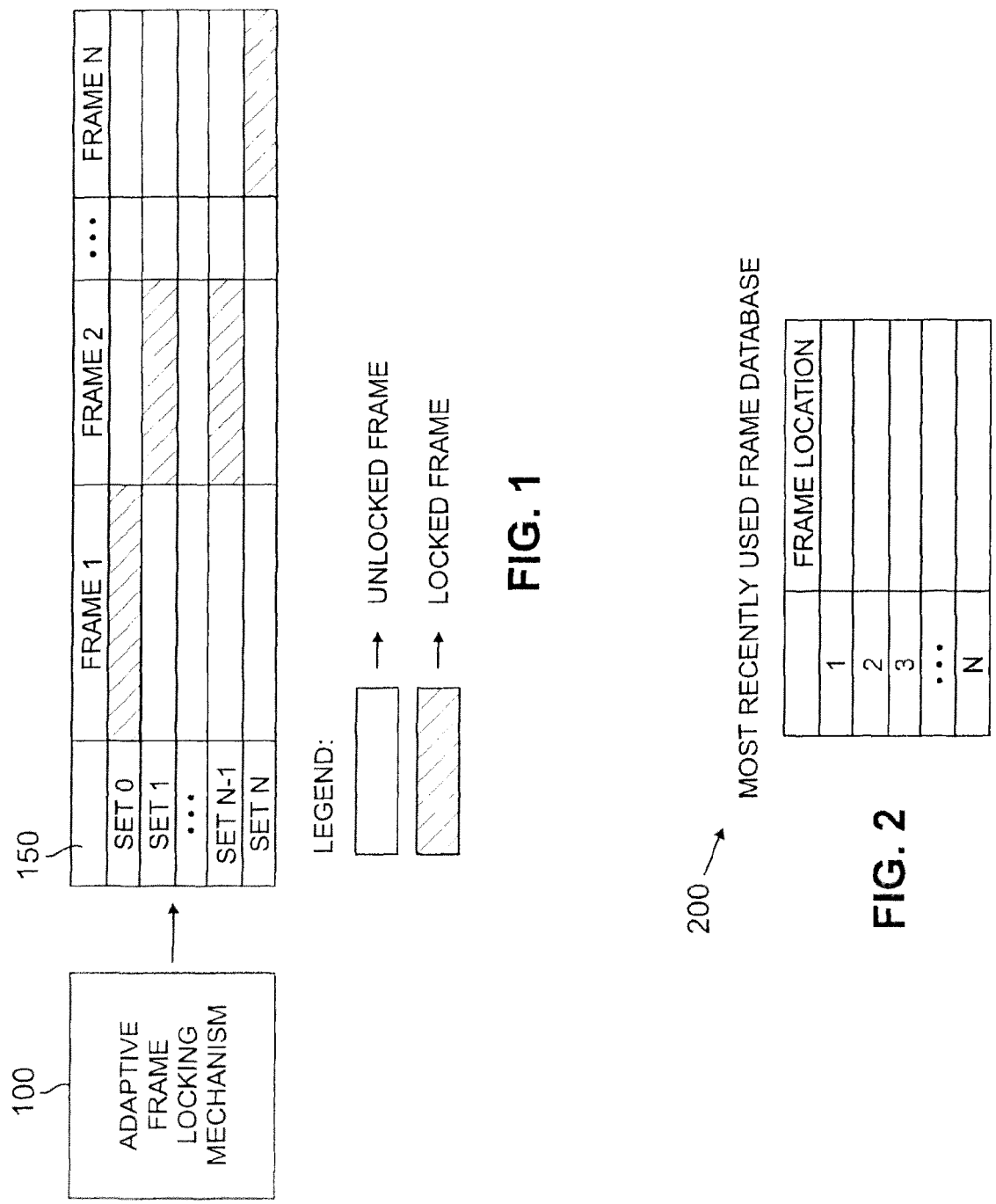

METHOD AND APPARATUS FOR ADAPTIVE CACHE FRAME LOCKING AND UNLOCKING

CROSS-REFERENCE TO RELATED APPLICATIONS

This application is a divisional of U.S. patent application Ser. No. 09/975,764, filed Oct. 9, 2001, incorporated by reference herein.

FIELD OF THE INVENTION

The present invention relates generally to cache memory devices, and more particularly, to methods and apparatus for adaptively locking and unlocking frames in such cache memories.

BACKGROUND OF THE INVENTION

Processors typically use a cache to improve performance and decrease system costs. Caches temporarily store recently accessed information (blocks of instructions or data) in a memory that is typically smaller and faster to access than a larger main memory. Caches are effective because a block that has been accessed once is likely to be accessed again in the near future or is often near a recently accessed block. Thus, as a task executes, the working set of a task (the instructions and data currently required for the task) is stored in the cache in the event that the information may be accessed again. A cache typically maps multiple blocks of information from the main memory into one place in a cache, typically referred to as a "set." A "block" refers to the minimum unit of information that can be present in a cache and a "frame" is the place in a cache where a single block may be stored. In a set associative cache, multiple frames are grouped into sets. For example, a two-way set associative cache has two frames in each set.

In many embedded applications, a primary task may be interrupted by one or more secondary tasks. Thus, following an interruption, as a secondary, interrupting task executes, the working set of the interrupting task is stored in the cache, potentially evicting the working set of the primary, interrupted task and thereby decreasing the performance of the primary task when it resumes execution. When the primary task resumes execution, portions of the working set that have been evicted from the cache must be obtained from main memory, causing a "cache miss." Thus, the execution time of the primary task is extended by the time taken to run the secondary task plus the miss penalty caused by obtaining evicted portions of the cached information from the main memory.

A number of techniques have been proposed or suggested for improving the performance of caches that are used with embedded processors. Cache frame locking, for example, is a technique that prevents the contents of specified cache frames from being evicted. In this technique, a specified group of frames is "locked" and the blocks they contain may not be evicted until they are unlocked. A block in a locked frame may be read or written by any task. A frame's invalidation causes the frame to be unlocked. Locking and unlocking may be exercised by the execution of a special instruction or by writing to a memory-mapped control register that may control groups of frames or individual frames. The locking of some of an executing task's frames prior to another task's execution ensures that blocks in those frames are not evicted. This may enhance the performance of the interrupted task when it resumes execution.

While conventional cache frame locking techniques have significantly improved cache performance in embedded processor systems, they suffer from a number of limitations, which if overcome, could further improve the performance of cache memories. Specifically, conventional cache frame locking techniques are not practical unless the frames in use by a task are known in advance, otherwise unnecessary frames may be locked, or frames key to efficient execution of the task may not be locked. In addition, locking unnecessary frames decreases the cache space that is available to an interrupting task, which may decrease performance of the interrupting task unnecessarily. However, knowledge of the frame use by a task is difficult to obtain because the specific frames that a task may access usually vary widely over time and often in a mariner that cannot be anticipated. Even if a task's frame use over time is known, it may be of little value if an interrupting task may begin execution at an indeterminate point in time, which is often the case.

A need therefore exists for a cache frame locking technique that automatically identifies appropriate frames to lock at any given time. More specifically, a need exists for a cache frame locking mechanism that identifies frames that are likely to be accessed by a task in the near future. Yet another need exists for a cache frame locking technique that adapts to the frame use of a particular task. In addition, a need exists for a mechanism that automatically unlocks frames that cause significant performance degradation for a running task.

SUMMARY OF THE INVENTION

Generally, a method and apparatus are disclosed for locking the most recently accessed frames in a cache memory. The most recently accessed frames in a cache memory are likely to be accessed by a task again in the near future. Thus, the most recently used frames may be locked in accordance with the present invention at the beginning of a task switch or interrupt, either with a special instruction or by automatic means, to improve the performance of the cache. The list of most recently used frames is updated as a task executes. The list of most recently used frames may be embodied, for example, as a list of frame addresses or a flag associated with each frame. The list of most recently used frames may be separately maintained for each task if multiple tasks may interrupt each other.

An adaptive frame unlocking mechanism is also disclosed that automatically unlocks frames that may cause a significant performance degradation for a task. The adaptive frame unlocking mechanism monitors a number of times a task experiences a frame miss and unlocks a given frame if the number of frame misses exceeds a predefined threshold.

A more complete understanding of the present invention, as well as further features and advantages of the present invention, will be obtained by reference to the following detailed description and drawings.

BRIEF DESCRIPTION OF THE DRAWINGS

FIG. 1 illustrates an adaptive frame locking mechanism in accordance with the present invention;

FIG. 2 is a sample table from an exemplary most recently used frame database that indicates addresses of the n most recently used frames;

DETAILED DESCRIPTION

Figure 3:
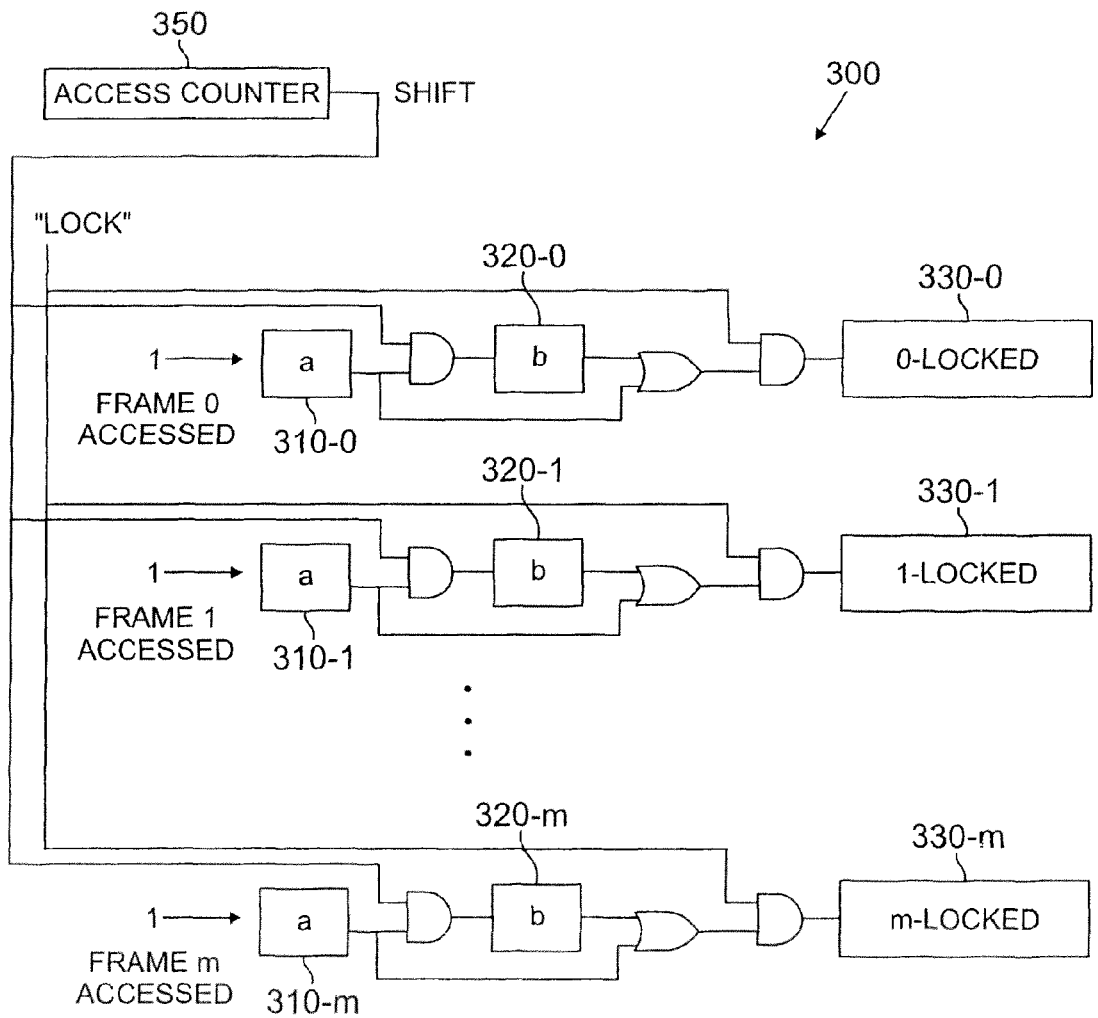
FIG. 3 illustrates an exemplary implementation of a most recently used frame circuit for use with the adaptive frame locking mechanism of FIG. 1.

FIG. 1 illustrates an adaptive frame locking mechanism 100 in accordance with the present invention. As shown in FIG. 1, the adaptive frame locking mechanism 100 selectively locks frames of a cache 150, such as frame 1 in set 0, frame 2 in sets 2 and n-1 and frame N in set N. According to one aspect of the present invention, frames are identified for locking that, at any particular time, are likely to be accessed by a task in the near future. Once locked, the information contained in a frame cannot by displaced by an interrupting task. According to a further aspect of the present invention, the frame locking mechanism adapts to the frame use of a particular task. In addition, as discussed further below, the present invention provides a mechanism that automatically unlocks frames that cause significant performance degradation for a running task.

The present invention continuously identifies cache frames during execution that are likely to be accessed by a task in the near future, so that these "valuable frames" may be locked at any time, if desired. While the present invention may be incorporated into all cache organizations (data or instruction), the present invention is illustrated with a two-way set associative instruction cache that has two frames at each set address. A table entry, addressed by an address of a block, specifies whether the block is in the cache and gives its location, in a known manner. The adaptive frame locking mechanism 100 and cache 150 can be part of a digital signal processor (DSP), microcontroller, microprocessor, application specific integrated circuit (ASIC) or another integrated circuit.

As previously indicated, caches are effective primarily because currently accessed information is likely to have been accessed recently or be near such information in the address space. The present invention records the cache locations of the last n frames accessed by an application, where n may be predefined or specified by a special instruction. These most recently used n frames may then be easily identified and locked in accordance with the present invention at the beginning of a task switch or interrupt. These n frames have been recently accessed, are thus likely to be accessed again and are likely valuable when an interrupted task resumes execution. In addition, since this collection of frames is updated as a task executes, it likely contains frames of value to a task at any given time and is therefore current when a task's execution is interrupted.

For example, if n is 16, the locations of the last 16 frames accessed in a cache are continuously recorded. Various methods may be used to record and access this information. FIG. 2 is a sample table from an exemplary most recently used frame database 200, indicating addresses of the n most recently used frames. The most recently used frame database 200 may be embodied, for example, as a first-in-first-out (FIFO) buffer having n elements. In this manner, the appropriate frame locations in the most recently used frame database 200 are continuously updated. When a task switch occurs, all frames identified in the most recently used frame database 200 are locked by the adaptive frame locking mechanism 100 either with a special instruction or by automatic means, if provided. The most recently used frame database 200 may include multiple columns if multiple tasks may interrupt each other, with a column associated with each task.

Alternatively, a "recently accessed frame" (raf) bit may be associated with each frame in the cache. The raf bit can be set to a binary value of one (1) when its associated frame is one of the last 16 frames accessed and a binary value of zero (0) when its associated frame is not one of the last 16 frames accessed. These bits may be recorded in a cache or elsewhere (e.g., in a processor). When a task switch occurs, all frames associated with "true" bits are locked either with a special instruction or by automatic means if provided. Multiple sets of raf bits may be maintained if multiple tasks may interrupt each other. In this case, a set may be maintained for each task.

In one variation, all the frames in a set may not be concurrently locked, to ensure minimal cache support for a running task. It is noted that frame locking prevents block evictions and not accesses. Thus, the locking of all the frames in a set does not in itself cause deadlock. If all the frames are locked in a set that is accessed during a read operation by a task that experiences a miss, the task receives the data from memory but the data is not stored in the cache. If a task experiences a miss during a write to a locked set, the new data from the processor is merged with data read from memory and then written back to memory. If a task experiences a hit during a write to a locked set, the cache is updated with the new data.

A write back cache may contain data written into it that has not yet been written into main memory. A block in a cache that is more recent than its image in main memory is termed "dirty." The dirty block is written to main memory when it is evicted, or if another process or another processor accesses the block in a coherent memory scheme. If another process attempts to gain ownership of a dirty block, the dirty block is written back to memory and then its frame is invalidated in the cache. If another process attempts to read data in a dirty block, the dirty block is written back to memory, and thereby becomes "clean," but the frame containing the block is not invalidated. These actions occur whether the frame is locked or not. Therefore, no special action is necessary in a write back data cache if dirty blocks are in locked frames. The only additional action that must occur in a cache that uses a frame locking scheme relative to one that does not use a frame locking scheme, is that a locked frame that is invalidated is unlocked, as would be expected, to free it for subsequent use by any task.

Adaptive Locking Mechanism

FIG. 3 illustrates an exemplary implementation of a most recently used frame circuit 300 for use with the adaptive frame locking mechanism 100 of FIG. 1. The most recently used frame circuit 300 records the most recently accessed frames. In the specific embodiment shown in FIG. 3, the most recently accessed 3n/2 frames (on average) are recorded, where n is an even number that may be set during execution and may be different for different tasks. The number of recently used frames recorded will vary over time between n and 2n, with the average being 3n/2. In addition, the number of frames that are locked can be predetermined and constant.

As shown in FIG. 3, the exemplary most recently used frame circuit 300 includes three one-bit latches 310-$i$, 320-$i$, 330-$i$ (hereinafter, referred to as latches "a," "b," and "locked") associated with each frame, i. Latch a is set when the frame that it is associated with is accessed. After every n accesses, the value in latch a of a frame is transferred to latch b and latch a is reset. Therefore, if a frame has been accessed during the last n accesses, latch b will be set. Following a transfer, latch a is again set when its frame is accessed. This operation continues during the execution of a program.

Figure 4:
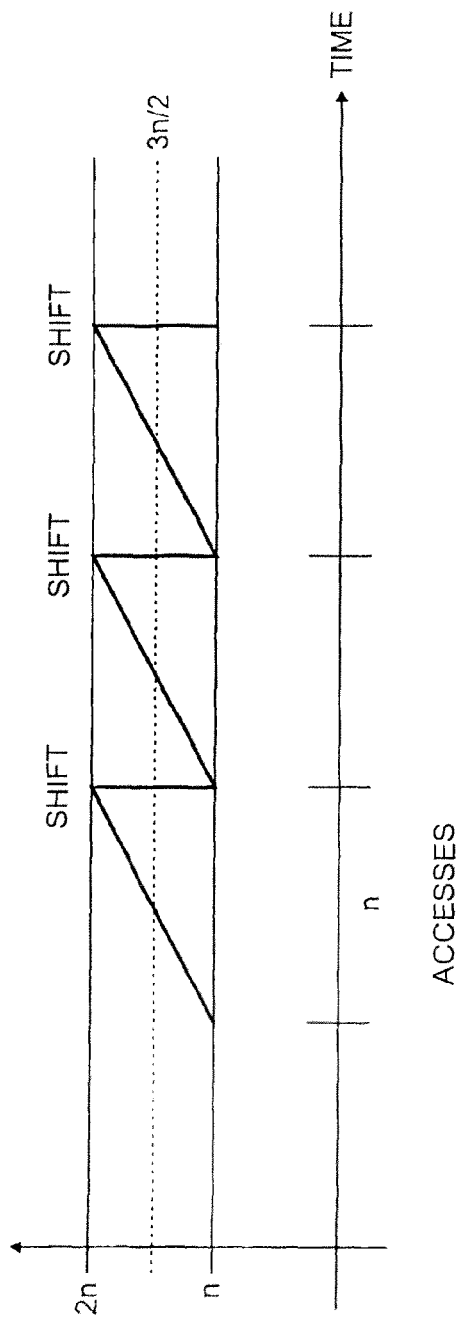
FIG. 4 illustrates the relative timing of the latch resets in the most recently used frame circuit of FIG. 3.

If an interrupt or task switch occurs and frame locking is desired, a "lock" signal may be generated via the execution of a special instruction or by other means. The lock signal sets a lock latch of a given frame, locking the frame, if either latch a or latch b is set when the lock signal is asserted. The number of frames locked therefore depends on the time relationship between the shift signal and the lock signal. This effect is shown in FIG. 4. Immediately after a shift (which resets all a latches), the positions of the last n frames accessed are recorded, whereas immediately before a shift, 2n are recorded.

Thus, the average number of locked frames is 3n/2 using two latches, a and b. Other values for the average (or predetermined) number of frames locked are possible by using various numbers of latches in the logic. If three latches are employed, for example, the average number of locked frames is 5n/2. In addition, the number of frames locked is constant rather than an average if the lock and shift signals are synchronized, i.e., if they have a constant time relationship. If the lock signal is asserted immediately before a shift, the most recently accessed 2n frames are always locked. Likewise, if the lock signal is always asserted immediately after a shift, the most recently accessed n frames are locked. In this manner, it is possible to make the number of frames locked predetermined and constant, rather than an average over time.

Adaptive Override Mechanism

If a task is executing in a system with a cache that contains locked frames (e.g., by one or more previously executing tasks), those frames are not available to the task for information storage. Depending on the nature of the task and the number and location of the locked frames, such a task may experience unacceptable miss rates with consequent performance degradation. Essentially, the locked frames have made the cache too small for the task. To prevent this from happening, an adaptive unlocking mechanism 500, discussed below in conjunction with FIG. 5, may be used to override raf bits, when necessary.

Figure 5:
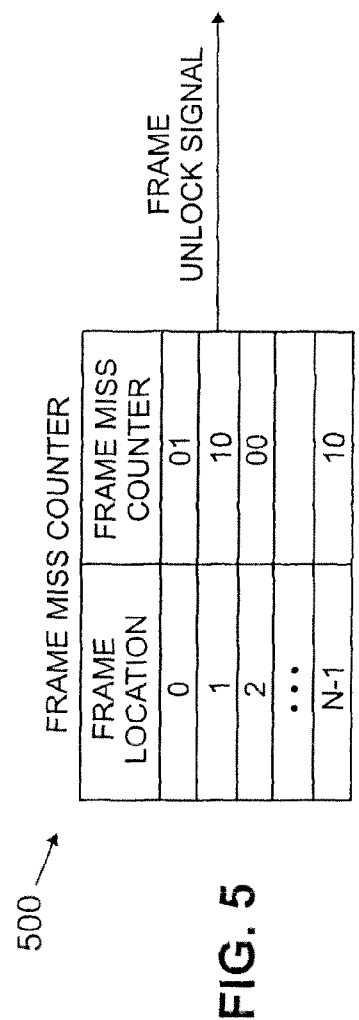
FIG. 5 illustrates an adaptive frame unlocking mechanism in accordance with the present invention.

As shown in FIG. 5, the adaptive unlocking mechanism 500 maintains "frame miss bits" that are associated with each frame (e.g., two bits). These bits are set to zero when a frame is locked. If a cache miss occurs at a set with a locked frame, the low-order miss-bit is set to a 1. The next miss at that set causes the high-order miss-bit to be set to a 1. The next miss (a miss that occurs with both miss-bits set) causes the frame to be unlocked. Thus, this exemplary mechanism 500 causes a locked frame to be unlocked if three misses occur on the set to which it belongs (if two miss bits are used). This enables a task to unlock a frame that is causing significant performance degradation.

The exemplary mechanism 500 shown in FIG. 5 may be enhanced by resetting the miss-bits under specified conditions (e.g., after some number of cache accesses, or after some hits occur in the set that contains a locked frame). Such a scheme would make the unlocking criteria an uninterrupted sequence of misses rather than a total number, for example. More or fewer miss-bits may be used, but regardless of their number, the mechanism remains essentially the same. The adaptive override mechanism 500 provides for the adaptive, progressive unlocking of frames that are significantly constraining the performance of a task operating in a cache with locked frames.

Set associative caches commonly evict the least recently used block from a set when it is necessary to bring a new block into the set. Least recently used (lru) bits are associated with each set for this purpose. Least recently used (lru) bits are managed to specify the frame in a set that holds a block of information whose last access occurred before the last accesses of any other blocks in the set. A two-way set associative cache has two frames in a set, for example, and maintains one lru bit per set to specify the frame that contains the block that should be evicted next. A binary value of zero (0), for example, may specify that frame-0 is least recently used while a binary value of one (1) may specify that frame-1 is least recently used.

In an implementation where the number of frames to be locked is always one-half the total number of frames in a cache, and where two frames in the same set may not be concurrently locked, an extremely simple implementation of the adaptive frame locking mechanism 100 is available. In this case, the existing lru bits may be used to lock the most recently used frames in the cache. Since an lru bit specifies the least recently used frame in a set, its inverse (in a two-way set associative cache) specifies the most recently used frame in a set. Together these bits specify the most recently used frames in a two-way set associative cache. Therefore, on an interrupt or task switch, it is only necessary to lock that frame in each set that is specified by the inverse of the set's lru hit.

It is to be understood that the embodiments and variations shown and described herein are merely illustrative of the principles of this invention and that various modifications may be implemented by those skilled in the art without departing from the scope and spirit of the invention.

We claim:

1. A method for locking frames in a cache memory, said method comprising the steps of:
   storing information from main memory in frames of said cache memory;
   monitoring a number of most recently used frames;
   locking said number of said most recently used frames if a task is interrupted by another task; and
   unlocking frames that cause a performance degradation for a task if a number of frame misses exceeds a predefined threshold.

2. The method of claim 1, wherein said monitoring step maintains a frame address of said most recently used frames.

3. The method of claim 1, wherein said monitoring step maintains a flag associated with said most recently used frames.

4. The method of claim 1, wherein said monitoring step maintains an identifier of the n most recently used frames for each of a plurality of tasks.

5. The method of claim 1, wherein said locking step does not lock all the frames in a set concurrently.

6. The method of claim 1, wherein said number of said most recently used frames identifies the most recently accessed 3n/2 frames on average.

7. The method of claim 1, wherein said step of unlocking further comprises the step of monitoring a number of times a task experiences a frame miss.

8. A cache memory comprising:
   a memory element for storing information from main memory in frames of said cache memory;
   means for monitoring a number of most recently used frames;
   means for locking said number of said most recently used frames if a task is interrupted by another task; and
   means for unlocking frames that cause a performance degradation for a task if a number of frame misses exceeds a predefined threshold.

9. The cache memory of claim 8, wherein said means for locking said frames does not lock all the frames in a set concurrently.

10. The cache memory of claim 8, wherein said means for unlocking includes a counter for monitoring a number of times a task experiences a frame miss.

11. The cache memory of claim 8, wherein said cache is a two way set associative cache and said most recently used frames are identified by taking an inverse of a least recently used identifier.

12. The cache memory of claim 8, wherein said locking is performed if a first task is interrupted by a second task.

* * * * *